US007099471B2

(12) United States Patent
Neff

(10) Patent No.: US 7,099,471 B2
(45) Date of Patent: Aug. 29, 2006

(54) DETECTING COMPROMISED BALLOTS

(75) Inventor: C. Andrew Neff, Bellevue, WA (US)

(73) Assignee: Dategrity Corporation, Bellevue, WA (US)

( * ) Notice: Subject to any disclaimer, the term of this patent is extended or adjusted under 35 U.S.C. 154(b) by 735 days.

(21) Appl. No.: 10/038,752

(22) Filed: Dec. 31, 2001

(65) Prior Publication Data

US 2002/0128978 A1   Sep. 12, 2002

Related U.S. Application Data

(63) Continuation-in-part of application No. 09/816,869, filed on Mar. 24, 2001, now Pat. No. 6,950,948, and a continuation-in-part of application No. 09/535,927, filed on Mar. 24, 2000, now abandoned, and a continuation-in-part of application No. 09/534,836, filed on Mar. 24, 2000.

(60) Provisional application No. 60/270,182, filed on Feb. 20, 2001.

(51) Int. Cl.
*H04K 1/00* (2006.01)
*G06F 11/00* (2006.01)
*H04L 9/00* (2006.01)

(52) U.S. Cl. .......................... 380/30; 705/12; 713/168; 713/175

(58) Field of Classification Search ................... 380/30
See application file for complete search history.

(56) References Cited

U.S. PATENT DOCUMENTS

| 4,774,665 A | 9/1988 | Webb |
| 5,278,753 A | 1/1994 | Graft, III |
| 5,400,248 A | 3/1995 | Chisholm |
| 5,495,532 A | 2/1996 | Kilian et al. |
| 5,521,980 A | 5/1996 | Brands |
| 5,610,383 A | 3/1997 | Chumbley |
| 5,682,430 A | 10/1997 | Kilian et al. |
| 5,708,714 A | 1/1998 | López et al. |
| 5,717,759 A | 2/1998 | Micali |
| 5,864,667 A | 1/1999 | Barkan |
| 5,875,432 A | 2/1999 | Sehr |
| 5,878,399 A | 3/1999 | Peralto |
| 5,970,385 A | 10/1999 | Pykalisto |
| 6,021,200 A | 2/2000 | Fischer |
| 6,081,793 A | 6/2000 | Challener et al. |

(Continued)

FOREIGN PATENT DOCUMENTS

CA    2176990    11/1996

(Continued)

OTHER PUBLICATIONS

Bruce Schneier, Applied Cryptography, Second Edition, 1996, John Wiley & Sons Inc., pp. 476-481, 490-491, 532-533.*

(Continued)

*Primary Examiner*—Emmanuel L. Moise
*Assistant Examiner*—Jeffery Williams
(74) *Attorney, Agent, or Firm*—Perkins Coie LLP

(57) ABSTRACT

A facility for discerning corruption of an electronic ballot is described. The facility sends from a first computer system to a second computer system an encrypted ballot that reflects a ballot choice selected by a voter. The facility then sends a confirmation from the second computer system to the first computer system, which serves to convey the decrypted contents of the encrypted ballot as received at the second computer system, and which is generated without decrypting the encrypted ballot. In the first computer system, the facility uses the confirmation to determine whether the decrypted contents of the encrypted ballot as received at the second computer system match the ballot choice selected by the voter.

15 Claims, 3 Drawing Sheets

U.S. PATENT DOCUMENTS

| | | | |
|---|---|---|---|
| 6,092,051 | A | 7/2000 | Kilian et al. |
| 6,250,548 | B1 | 6/2001 | McClure et al. |
| 6,317,833 | B1 | 11/2001 | Jakobsson |
| 6,523,115 | B1 | 2/2003 | Ono et al. |
| 6,550,675 | B1 | 4/2003 | Davis et al. |
| 6,769,613 | B1 | 8/2004 | McDermott et al. |
| 6,845,447 | B1 | 1/2005 | Fujioka et al. |
| 2002/0074399 | A1* | 6/2002 | Hall et al. ................. 235/386 |
| 2002/0077885 | A1* | 6/2002 | Karro et al. ................. 705/12 |
| 2002/0077887 | A1* | 6/2002 | Shrader et al. .............. 705/12 |
| 2002/0133396 | A1* | 9/2002 | Barnhart ..................... 705/12 |

FOREIGN PATENT DOCUMENTS

| | | |
|---|---|---|
| EP | 0 697 776 A2 | 2/1996 |
| EP | 0 743 620 A2 | 11/1996 |
| JP | 08-263575 | 10/1996 |
| JP | 08-315053 | 11/1996 |
| JP | 10-257047 | 9/1998 |
| JP | 10-285157 | 10/1998 |
| WO | WO92/03805 A1 | 3/1992 |
| WO | WO 98/14921 | 4/1998 |
| WO | WO01/22200 A2 | 3/2001 |

OTHER PUBLICATIONS

International Preliminary Examination Report, International Application No. PCT/US01/43962, Jun. 3, 2003, 4 pages.

Cranor, L. F., "Electronic Voting, Computerized polls may save money, protect privacy," Crossroads, The ACM's First Electronic Publication, May 6, 1999, 4 pages.

Herschberg, M. A., "Secure Electronic Voting Over the World Wide Web," Massachusetts Institute of Technology, May 27, 1997, 81 pages.

Benaloh, J., "Secret Sharing Homomorphisms: Keeping Shares of a Secret Secret", Advances in Cryptology—CRYPTO 1986, Lecture Notes in Computer Science, pp. 251-260, Springer-Verlag, Berlin, 1987.

Benaloh, J., et al., "Distributing the Power of a Government to Enhance the Privacy of Voters", ACM Symposium on Principles of Distributed Computing, pp. 52-62, 1986.

Borrell, Joan et al., "An implementable secure voting scheme", Computers & Security, Elsevier Science, Ltd., Great Britain, 1996, vol. 15, No. 4, pp. 327-338.

Chaum, D, "Elections with Unconditionally-Secret Ballots and Disruption Equivalent to Breaking RSA", EUROCRYPT 1988, pp. 177-182.

Chaum, D., "Untraceable Electronic Mail, Return Addresses, and Digital Pseudonyms", Communications of the ACM, 24(2):84-88, 1981.

Cramer, R, et al., "A Secure and Optimally Efficient Multi-Authority Election Scheme", Advances in Cryptology—EUROCRYPT 1997, Lecture Notes in Computer Science, Springer-Verlag, 1997.

Cramer, R., et al., "Multi-Authority, Secret-Ballot Elections with Linear Work", Advances in Cryptology—EUROCRYPT 1996, Lecture Notes in Computer Science, Springer-Verlag, Berlin, 1996.

Cramer, R., et al., Proofs of Partial Knowledge and Simplified Design of Cryptology—CRYPTO 1994, Lecture Notes in Computer Science, pp. 174-187, Springer-Verlag, Berlin, 1994.

Cranor, Lorrie et al., "Sensus: A Security-Conscious Electronic Polling System for the Internet", Proceedings of the Hawaii International Conference on System Sciences, IEEE 1997, pp. 561-570.

Diffie, W., et al., "New Directions in Cryptography", IEEE Transactions on Information Theory, 22(6):644-654, 1976.

ElGamal, T., "A Public Key Cryptosystem and a Signature Scheme Based on Discrete Logarithms", IEEE Transacitons on Information Theory, IT-31(4):469-472, 1985.

Fiat, A., et al., "How to Prove Yourself: Practical Solutions to Identification and Signature Problems", Advances in Cryptology—CRYPTO 1986, Lecture Notes in Computer Science, pp. 186-194, Springer-Verlag, New York, 1987.

Fujioka, A., et al., "A Practical Secret Voting Scheme for Large Scale Elections", Advances in Cryptology—AUSCRYPT 1992, Lecture Notes in Computer Science, pp. 244-251, Springer-Verlag, 1992.

Gennaro, R., "Achieving independence efficiently and securely", Proceedings 14th ACM Symposium on Principles of Distributed Computing (PODC 1995), New York 1995.

Iversen, K., "A Cryptographic Scheme for Computerized General Elections", CRYPTO 1991, pp. 405-419.

Jan, Jin-Ke et al., "A Secure Electronic Voting Protocol with IC Cards", Elsevier Science Inc., New York, J. Systems Software 1997, 39:93-101.

Mu, Yi et al., "Anonymous Secure E-Voting over a Network", Proceedings, Annual Computer Security Applications Conference, IEEE 1998, pp. 293-299.

Odlyzko, A. M., "Discrete logarithms in finite fields and their cryptographic significance", Advances in Cryptology—EUROCRYPT 1984, Notes in Computer Science, Springer-Verlag, 1984.

Park, C., et al., "Efficient Anonymous Channel and All/Nothing Election Scheme", Advances in Cryptology—EUROCRYPT 1993, Lecture Notes in Computer Science, pp. 248-259, Springer-Verlag, 1993.

Pedersen, T., "A Threshold Cryptosystem without a Trusted Party", Advances in Cryptology—EUROCRYPT 1991, Lecture Notes in Computer Science, pp. 522-526, Springer-Verlag, 1991.

Sako, K., et al., "Receipt-Free Mix-Type Voting Scheme—A practical solution to the implementation of a voting booth", EUROCRYPT 1995, pp. 393-403.

Sako, K., et al, "Secure Voting Using Partially Compatible Homomorphisms", Advances in Cryptology—CRYPTO 1994, Lecture Notes in Computer Science, Springer-Verlag, 1994.

Schnorr, C.P., "Efficient Signature Generation by Smart Cards", Journal of Cryptology, 4(3): 161-174, 1991.

Schoenmakers, B., "A Simple Publicly Verifiable Secret Sharing Scheme and its Application to Electronic Voting", Advances in Cryptology—CRYPTO 1999, Lecture Notes in Computer Science, pp. 1-17, Springer-Verlag 1999.

Shamir, A., "How to Share a Secret", Communications of the ACM, 22(11):612-613, 1979.

Benaloh, J. et al., "Receipt-Free Secret-Ballot Elections," Proceedings of 26th ACM Symposium on Theory of computing, Montreal, May 1994, pp. 544-553.

Chaum, D., "Secret-Ballot Receipts: True Voter-Verifiable Elections," IEEE Computer Society, IEEE Security & Privacy, Jan.-Feb. 2004, vol. 2, No. 1, pp. 38-47.

Chaum, D., et al., "Wallet Databases with Observers," CRYPTO, 1992, vol. 740, Lecture Notes in Computer Science, pp. 89-105.

Cramer, R, et al., "A Secure and Optimally Efficient Multi-Authority Election Scheme", European Transactions on Telecommunications, Sep.-Oct., 1997, pp. 481-490, 8(5), EUREL Publication, 1997.

Koblitz, N., "Public Key," Chapter IV, A Course in Number Theory and Cryptograph, 2nd Edition, pp. 83-124, Springer-Verlag, 1994.

Naor, M., et al., "Visual Cryptograph," Eurocrypt 94, LNCS, Springer-Verlag, Berlin, 1995, vol. 950, pp. 1-12.

Neff, C.A., "A Verifiable Secret Shuffles and its Application to E-Voting," Eighth ACM Conference on Computer and Communications Security (CCS-8), Nov. 2001, pp. 116-125.

Davies, D.W., et al., "Security for Computer Networks," John Wiley & Sons, Ltd., Great Britain, 1984, pp. 253-257.

Liu, Shengli et al., "A Voting Protocol based on Elliptic Curve Cryptosystems," Journal of Electronics, Jan. 2000, pp. 84-89, vol. 22, No. 1 (English translation attached.).

* cited by examiner

DETECTING COMPROMISED BALLOTS

RELATED APPLICATIONS

This application claims the benefit of U.S. Provisional Application No. 60/210,182 filed Feb. 20, 2001, and is a continuation-in-part of each of U.S. patent application Ser. No. 09/534,836, filed Mar. 24, 2000; U.S. patent application Ser. No. 09/535,927, filed Mar. 24, 2000 now abandoned; and U S. patent application Ser. No. 09/816,869 filed Mar. 24, 2001 now U.S. Pat. No. 6,950,948. Each of these four applications is incorporated by reference in its entirety.

TECHNICAL FIELD

The present invention is directed to the fields of election automation and cryptographic techniques therefor.

BACKGROUND

The problems of inaccuracy and inefficiency have long attended conventional, manually-conducted elections. While it has been widely suggested that computers could be used to make elections more accurate and efficient, computers bring with them their own pitfalls. Since electronic data is so easily altered, many electronic voting systems are prone to several types of failures that are far less likely to occur with conventional voting systems.

One class of such failures relates to the uncertain integrity of the voter's computer, or other computing device. In today's networked computing environment, it is extremely difficult to keep any machine safe from malicious software. Such software is often able to remain hidden on a computer for long periods of time before actually performing a malicious action. In the meantime, it may replicate itself to other computers on the network, or computers that have some minimal interaction with the network. It may even be transferred to computers that are not networked by way of permanent media carried by users.

In the context of electronic secret ballot elections, this kind of malicious software is especially dangerous, since even when its malicious action is triggered, it may go undetected, and hence left to disrupt more elections in the future. Controlled logic and accuracy tests ("L&A tests") monitor the processing of test ballots to determine whether a voting system is operating properly, and may be used in an attempt to detect malicious software present in a voter's computer. L&A tests are extremely difficult to conduct effectively, however, since it is possible that the malicious software may be able to differentiate between "real" and "test" ballots, and leave all "test" ballots unaffected. Since the requirement for ballot secrecy makes it impossible to inspect "real" ballots for compromise, even exhaustive L&A testing may prove futile. The problem of combating this threat is known as the "Client Trust Problem."

Most existing methods for solving the Client Trust Problem have focused on methods to secure the voting platform, and thus provide certainty that the voter's computer is "clean," or "uninfected." Unfortunately, the expertise and ongoing diligent labor that is required to achieve an acceptable level of such certainty typically forces electronic voting systems into the controlled environment of the poll site, where the client computer systems can be maintained and monitored by computer and network experts. These poll site systems can still offer some advantages by way of ease of configuration, ease of use, efficiency of tabulation, and cost. However, this approach fails to deliver on the great potential for distributed communication that has been exploited in the world of e-commerce.

Accordingly, a solution to the Client Trust Problem that does not require the voting platform to be secured against malicious software, which enables practically any computer system anywhere to be used as the voting platform, would have significant utility.

DETAILED DESCRIPTION

Figure 1:
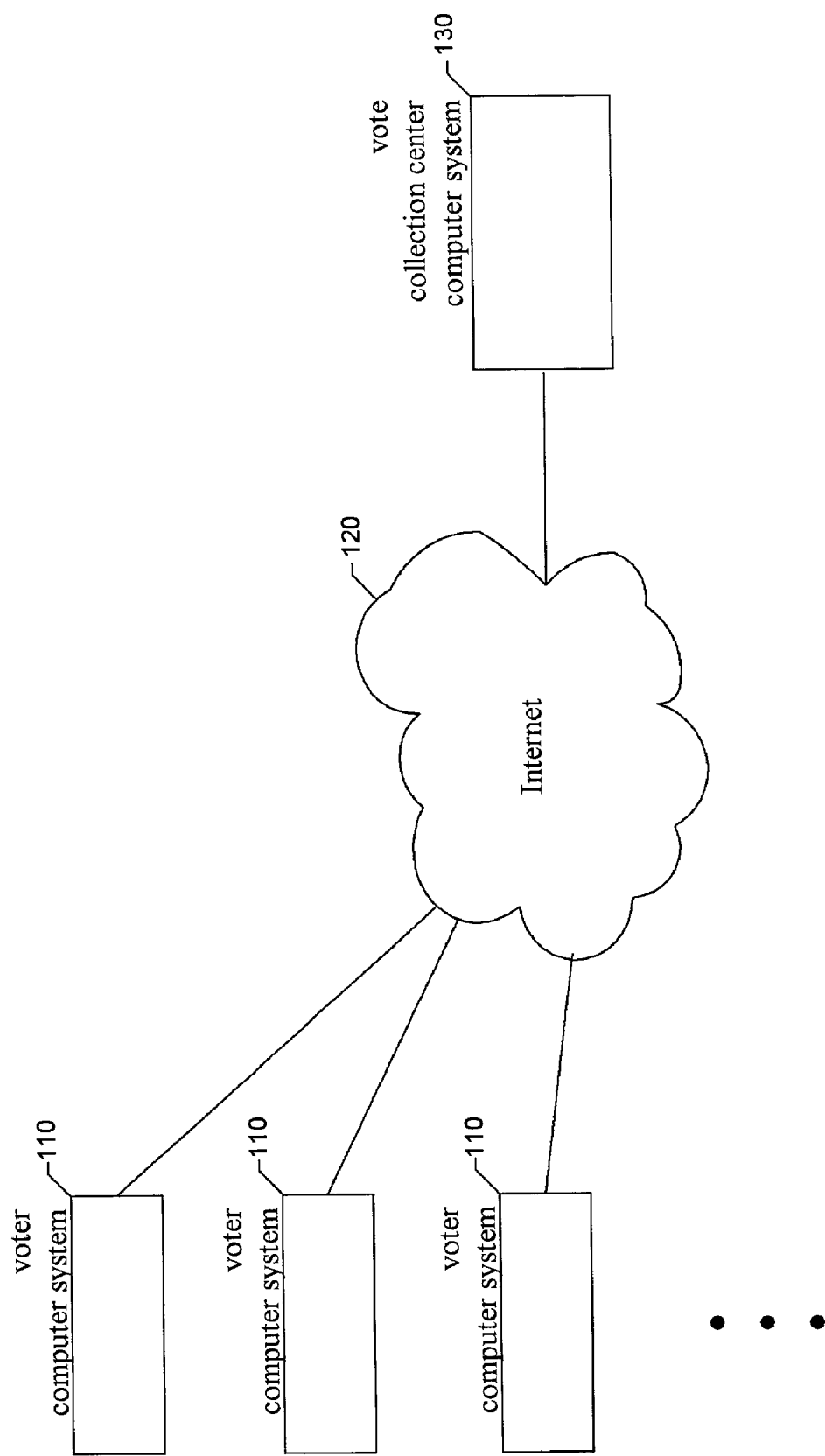
FIG. 1 is a high-level block diagram showing a typical environment in which the facility operates.

A software facility for detecting ballots compromised by malicious programs ("the facility") is provided. The approach employed by the facility is unique in that it does not make any attempt to eliminate, or prevent the existence of malicious software on the voting computer. Instead, it offers a cryptographically secure method for the voter to verify the contents of the voter's ballot as it is received at the vote collection center, without revealing information about the contents (ballot choices) to the collection center itself. That is, the vote collection center can confirm to the voter exactly what choices were received, without knowing what those choices are. Thus, the voter can detect any differences between the voter's intended choices, and the actual choices received at the vote collection center (as represented in the transmitted voted ballot digital data). Further, each election can choose from a flexible set of policy decisions allowing a voter to re-cast the voter's ballot in the case that the received choices differ from the intended choices.

A. The Simplest Secret Value Confirmation Setting

In order to understand the key cryptographic protocol that makes secret value confirmation possible, we first describe a simplified embodiment of the facility. In accordance with this embodiment, the ballot consists of a single yes or no question. The challenge then is to have the voter secretly communicate the voter's choice—yes or no—to the vote collection center, and then further confirm that what was actually received at the vote collection center was exactly what the voter intended. In other words, if a "yes" vote was somehow changed to a "no" vote, or a "no" vote was somehow changed to a "yes" vote, the facility informs the voter of this fact.

An electronic vote representation is used to represent the contents of the voter's ballot. Suitable electronic vote representations include those described in the patent applications identified in the related application section.

1. Ballot Construction: A set of cryptographic "election parameters" are agreed upon by election officials in advance of the election start, and made publicly known by wide publication or other such means. These parameters include encryption group, generator, ElGamal public key, and decision encoding scheme. Most commonly these consist of:

(a) The encryption group: A large prime, p.

(b) The generator: An integer (or, technically, an integer residue class) $g \in Z_p$, which has prime multiplicative order q, with the property that q is a multiplicity 1 divisor of p−1.

(c) The ElGamal public key: Another integer residue class, $h \in <g>$. That is, $h = g^s$ for some integer value of s.

(d) The decision encoding scheme: A partition of $\langle g \rangle$ into "yes", "no" and "invalid" group elements. That is, $\langle g \rangle = S_y \cup S_n \cup S_i$, where the $S_y, S_n, S_i$ are pairwise disjoint subsets of $\langle g \rangle$—the "yes" messages, "no" messages, and "invalid" messages respectively.

However, other groups and elements can be used. In particular, the facility may be implemented using Elliptic Curves rather than $Z_p$ groups.

2. Vote Submission: Each voter encrypts the voter's decision, "yes" or "no", as an ElGamal pair, $(X_i, Y_i) = (g^\alpha, h^\alpha m)$, where $\alpha \in Z_q$ is chosen randomly by the voter, $m \in S_y$ if the voter wishes to choose "yes" and $m \in S_n$ if the voter wishes to choose "no". Any other message (i.e., $m \in S_i$) is considered invalid. This encrypted value is what is digitally signed by the voter, and then transmitted to the vote collection center. For now, we will consider a simple decision encoding scheme in which $S_y = \{G_y\}$, $S_n = \{G_n\}$, and $S_i = \langle g \rangle - \{G_y, G_n\}$. However, with obvious small modifications, the discussion that follows applies equally well to more general settings.

If the voter was computing these values himself—say with pencil and paper—this protocol would essentially suffice to implement a secret-ballot, universally verifiable election system. (Depending on the tabulation method to be used, some additional information, such as a voter proof of validity may be necessary.) However, since the voter only makes choices through a user interface, it is in many cases unrealistic to expect him/her to check the actual value of the bits sent and compare them to the voter's intent. In short, malicious software can ignore voter intent and submit a "no" vote when the voter specified "yes", or submit a "yes" vote when the voter specified "no".

B. Creating a Secret Value Confirmation

We differentiate two types of vote corruption, directed and undirected. Directed vote corruption is the act of changing a "yes" vote to a "no" vote, or a "no" vote to a "yes" vote. Undirected vote corruption is the act of changing from a "valid" vote ("yes" or "no") to an "invalid" vote. The following steps will detect directed vote corruption in the simple ballot setting of the previous section. They rely on the intractability of the Diffie-Hellman Problem described in A. M. Odlyzko, *Discrete logarithms in finite fields and their cryptographic significance,* Advances in Cryptology—EURO-CRYPT '84, Lecture Notes in Computer Science, Springer-Verlag, 1984.

1. The computer operated by voter $V_i$ submits the encrypted decision as before, optionally signing the encrypted decision using a private key of this voter.

2. The vote collection center generates two values $K_i \in Z_p$ and $\beta_i \in Z_q$ randomly and independently. These values are generated on a per voter basis, and kept secret from all but the collection center. They may be generated in advance of the election.

3. The vote collection center computes the values $$W_i = K_i Y_i^{\beta_i} = K_i h^{\alpha_i \beta_i} m^{\beta_i} \qquad (1)$$

$$U_i = h^{\beta_i} \qquad (2)$$

and returns them to the voter's computer. $W_i$ and $U_i$ are together known as the "encrypted vote confirmation."

4. The voter's computer, knowing the secret $\alpha_i$ can compute $W_i / U_i^{\alpha_i} = K_i m^{\beta_i}$. It then displays this value to the voter. In some embodiments, the facility displays a hash of this value to the voter, rather than the value itself. When displaying the hash, the length of the data is generally shorter, thus enabling the voter to read and compare fewer characters.

The vote collection center does not know what value is, or should be, displayed, since the vote data it received was strongly encrypted. However, it does know:

(a) If the voter voted "yes", the value $K_i m_y^{\beta_i}$ should be displayed, (b) If the voter voted "no", the value $K_i m_n^{\beta_i}$ should be displayed, (c) If the voter voted any invalid value, a value other than these two should be displayed.

5. The voter can now check the validity of the vote received by contacting the vote collection center though some secure communication channel, such as telephone, fax, or surface mail. By sending a request containing (a) The voter's voter id.

(b) Optionally, a short PIN (4–5 digits typically suffice) to prevent the malicious software from masquerading remotely as the voter.

the voter can obtain from the vote collection center a "confirmation dictionary" indicating the two possible values the voter should have seen displayed depending on how the voter voted, such as "If you voted 'yes', your confirmation string should be 'xyz . . . ' and if you voted 'no', your confirmation string should be 'abc . . . .'" In some embodiments, the confirmation dictionary is supplied to the voter in advance of the election. For example, the unique confirmation dictionary for each voter could be sent through the postal mail as part of a "voter information packet." (Note that absentee ballots are delivered to voters through the postal mail.)

6. The voter verifies that the confirmation string the voter saw displayed by the voter's computer is consistent with both the voter's intended choice and this confirmation dictionary.

7. Any inconsistency indicates that some sort of unexpected behavior has occurred on the voter's computer, or in transmission, and corrective action should be taken. In many electronic voting schemes, an individual voter's ballot can be removed from the ballot box and resubmitted. The exact procedure for voter corrective action is a matter of policy, and may involve some form of voter protest, followed by a resubmission of the ballot in a controlled, secure environment. Alternatively, the voter may be allowed a few attempts from a remote computer before being forced to go to a controlled environment to resubmit.

The essential cryptographic foundation of this protocol is that the voter's computer, or malicious software running on it, cannot (for well chosen—i.e., randomly chosen—$m_y$ and $m_n$) compute the complementary confirmation string, i.e., compute $K_i m_n^{\beta_i}$ from $K_i m_y^{\beta_i}$ (or visa versa). This is because doing so requires computing $(m_n / m_y)^{\beta_i}$ (or visa versa), and the only information available to aid in this task is $h^{\beta_i}$. In short, the malicious software would have to solve an instance of the Diffie-Hellman Problem.

C. An Attack on the Previous Protocol

As noted, malicious software cannot conduct directed vote corruption without the corruption being detected and later corrected. However, the basic version of the protocol outlined above in some cases may allow undirected vote corruption to go undetected as in the following scenario.

1. Instead of submitting $(X_i,Y_i)$ as the voter intends, the voter's computer can submit $(X_i,Y^\gamma h^\gamma)$ for any chosen $\gamma \epsilon Z_q$. This will have the effect of transforming a valid vote into an invalid one. When the computer receives the encrypted vote confirmation, it can follow the protocol to compute $K_i h^{\gamma \beta_i} m^{\beta_i}$.

2. Were it to display this value, the voter would notice a problem, since it would not match the confirmation dictionary. However, since the malicious software generated, and knows $\gamma_i$ and also knows $h^{\beta_i}$ from the encrypted confirmation it received, it can compute $(h^{\beta_i})^\gamma = h^{\gamma \beta_i}$. By division, it can then compute right value $K_i m^{\beta_i}$—i.e., the one to match the voter's confirmation dictionary—and display it, thereby fooling the voter. Of course, invalid votes will be detected at tabulation time, but this will usually be too late for corrective action to be taken. Embodiments of the facility guard against such an undirected attack by employing a voter validity proof as discussed in the next section.

D. Counter Attack—Voter Validity Proof

The validity proof constructed by the voter proves to the vote collection center that, $(X_i,Y_i)_i$ the encrypted decision (ballot) received from voter $V_i$, is either an encryption of $m_y$ or an encryption of $m_n$ without revealing any information about which of these values it is. Methods for constructing validity proofs of this type can be found in U.S. patent application Ser. No. 09/535,927 now abandoned, as well as R. Cramer, I. Damgard, B. Schoenmakers, *Proofs of partial knowledge and simplified design of witness hiding protocols*, Advances in Cryptology, CRYPTO '94, Lecture Notes in Computer Science, pp. 174–187, Springer-Verlag, Berlin, 1994, which is hereby incorporated by reference in its entirety. Thus, the validity proof proves that the received encrypted ballot is valid, which is exactly what is needed to prevent the undetected, undirected vote corruption of the previous section. The malicious software may try an undirected vote corruption as before, but it will not be able to supply the required validity proof, and thus will be detected even before the encrypted vote confirmation is returned to the voter. As already noted, the secret value confirmation protocol itself detects directed vote corruption.

The validity proofs can be extended to more general sets of response options than simple "yes/no". As a result, the facility is able to prevent the attack of section C in the more general case as well. The resulting protocol for the general case is as follows.

1. Ballot Construction: The encryption group, generator, and ElGamal public key are all created as usual. However, the decision encoding scheme needs to be chosen carefully. For simplicity, let us assume that there is only one question on the ballot. (If there are multiple questions, the facility performs the steps that follow independently for each of the individual questions.) Let $a_1, \ldots, a_n$ be the set of allowable answers. For example, these could be $a_1$='George Bush', $a_2$='Al Gore', $a_3$='Ralph Nader', and $a_4$='I abstain'. Note that in this example, n=4.

The jurisdiction, or other entity responsible for creating the ballot, must select n elements from $Z_q, \mu_1, \ldots, \mu_n$, independently and at random. These are assigned, in sequence, as the corresponding response values to each allowable answer, resulting the specific decision encoding scheme. In the example, this means that the digital blank ballot publicly specifies that a vote for 'George Bush' should be submitted as $(g^\alpha, h^\alpha \mu_1)$, i.e., an encryption of $\mu_1$, a vote for 'Al Gore' should be submitted as $(g^\alpha, h^\alpha \mu_2)$, i.e., an encryption of $\mu_2$, a vote for 'Ralph Nader' should be submitted as $(g^\alpha, h^\alpha \mu_3)$, i.e., an encryption of $\mu_3$, an abstention should be submitted as $(g^\alpha, h^\alpha \mu_4)$, i.e., an encryption of $\mu_4$.

2. Vote Submission:

(a) The computer operated by voter $V_i$ submits an encrypted ballot on behalf of voter $V_i$ as before, denoted as $(X_i,Y_i)=(g^{\alpha_i}, h^{\alpha_i} \mu)$ for some value $\mu \epsilon <g>$ and $\alpha_i \epsilon Z_q$.

(b) The computer operated by voter $V_i$ also constructs a validity proof, $P_i$, as indicated above, in order to prove that $\mu \epsilon \{\mu_1, \ldots, \mu_n\}$ without revealing any more information about its specific value.

(c) The computer operated by voter $V_i$ then submits both $P_i$ and the encrypted vote, $(X_i,Y_i)$ to the vote collection center.

(d) Before accepting the encrypted ballot, the vote collection center first checks the proof, $P_i$. If verification of $P_i$ fails, corruption has already been detected, and the vote collection center can either issue no confirmation string, or issue a random one.

(e) Assuming then that verification of $P_i$ succeeds, the vote collection center computes the values, $W_i$ and $U_i$ as in section B, steps 2 and 3, and returns these to the computer operated by voter $V_i$.

(f) As in section B, the computer operated by voter $V_i$ can compute $C=W_i/U_i^{\alpha_i}$, and display this string (or a hash of it) to the voter.

(g) As in section B, step 5, the voter can now compare the displayed string against the voter's confirmation dictionary (obtained by one of the various modes described there). In general, the confirmation dictionary for voter $V_i$ would consist of the following table laid out in any reasonable format:

| | |
|---|---|
| $a_1$ | $h(C_{i1})$ |
| $a_2$ | $h(C_{i2})$ |
| . | . |
| . | . |
| . | . |
| $a_n$ | $h(C_{in})$ | where h is the election's public (i.e., published) hash function, and $C_{ij}=K_i \mu_j^{\beta_i}$, (h) Since the $\mu_i$ were chosen randomly and independently, any software (in particular, malicious software) can only display the confirmation string corresponding to the $\mu$ that was submitted or, obviously, an invalid confirmation string—it can not compute any other valid confirmation string without solving the Diffie-Hellman problem. Thus, if a $\mu$ different from the one intended by the voter is submitted, the confirmation string displayed will not match the correct confirmation string in the dictionary, and the voter will be able to detect corruption. In the case of detected corruption, corrective action can be taken as described above.

In order to more completely describe the facility, an example illustrating the operation of some of its embodiments is described hereafter.

The following is a detailed example of a Secret Value Confirmation exchange. In order to maximize the clarity of the example, several of the basic parameters used—for example, the number of questions on the ballot, and the size of the cryptographic parameters—are much smaller than those that would be typically used in practice. Also, while aspects of the example exchange are discussed below in a particular order, those skilled in the art will recognize that they may be performed in a variety of other orders.

Some electronic election protocols include additional features, such as:
- voter and authority certificate (public key) information for authentication and audit
- ballot page style parameters
- data encoding standards
- tabulation protocol and parameters As these features are independent of the Secret Value Confirmation implementation, a detailed description of them is not included in this example.

This example assumes an election protocol that encodes voter responses (answers) as a single ElGamal pair. However, from the description found here, it is a trivial matter to also construct a Secret Value Confirmation exchange for other election protocols using ElGamal encryption for the voted ballot. For example, some embodiments of the facility incorporate the homomorphic election protocol described in U.S. patent application Ser. No. 09/535,927 now abandoned. In that protocol, a voter response is represented by multiple ElGamal pairs. The confirmation dictionary used in this example is easily modified to either display a concatenation of the respective confirmation strings, or to display a hash of the sequence of them.

The jurisdiction must first agree on the election initialization data. This at least includes: the basic cryptographic numerical parameters, a ballot (i.e. a set of questions and allowable answers, etc.), and a decision encoding scheme. (It may also include additional data relevant to the particular election protocol being used.)

Cryptographic Parameters
  Group Arithmetic: Integer multiplicative modular arithmetic
  Prime Modulus: p=47
  Subgroup Modulus: q=23
  Generator: g=2.
  Public Key: $h=g^s$ where s is secret. For sake of this example, let us say that $h=g^{12}=7$.

Ballot
  One Question
    Question 1 Text: Which colors should we make our flag? (Select at most 1.)
    Number of answers/choices: 4
      Answer 1 Text: Blue
      Answer 2 Text: Green
      Answer 3 Text: Red
      Answer 4 Text: I abstain Decision Encoding Scheme

| Choice | Response Value |
| --- | --- |
| Blue | 9 ($\mu_1$) |
| Green | 21 ($\mu_2$) |
| Red | 36 ($\mu_3$) |
| I abstain | 17 ($\mu_4$) |

At some point, before issuing a confirmation and before distributing the voter confirmation dictionaries, the ballot collection center (or agency) generates random, independent $\beta_i$ and $K_i$ for each voter, $V_i$. If the confirmation dictionary is to be sent after vote reception, these parameters can be generated, on a voter by voter basis, immediately after each voted ballot is accepted. Alternatively, they can be generated in advance of the election. In this example, the ballot collection agency has access to these parameters both immediately after accepting the voted ballot, and immediately before sending the respective voter's confirmation dictionary.

Sometime during the official polling time, each voter, $V_i$ obtains, and authenticates, the election initialization data, described above. It can be obtained by submitting a "ballot request" to some ballot server. Alternatively, the jurisdiction may have some convenient means to "publish" the election initialization data—that is, make it conveniently available to all voters.

From the election initialization data, V is able to determine that the expected response is the standard encoding of a particular sequence of two distinct data elements. These are (in their precise order):

Choice Encryption A pair of integers (X, Y) with $0 \leq X, Y < 47$ indicating (in encrypted form) the voter's choice, or answer. For the answer to be valid, it must be of the form, $(X, Y)=(2^\alpha, 7^\alpha \mu)$, where $0 \leq \alpha < 23$ and $\mu \in \{9, 21, 36, 17\}$.

Proof of Validity A proof of validity showing that (X, Y) is of the form described in the choice encryption step above. (In this example, we shall see that this proof consists of 15 modular integers arranged in specific sequence.)

For the sake of this example, let us assume that V wishes to cast a vote for "Green".

1. V generates $\alpha \in Z_{23}$ randomly. In this example, $\alpha=5$. Since the encoding of "Green" is 21, V's choice encryption is computed as $$(X,\ Y)=(2^5,\ 7^5 \times 21)=(32,\ 24) \qquad (3)$$

This pair is what should be sent to the vote collection center. The potential threat is that V's computer may try to alter these values.

Voter V (or more precisely, V's computer) must prove that one of the following conditions hold
1. $(X, Y)=(2^\alpha, 7^\alpha \times 9)$ i.e. choice (vote cast) is "Blue"
2. $(X, Y)=(2^\alpha, 7^\alpha \times 21)$ i.e. choice (vote cast) is "Green"
3. $(X, Y)=(2^\alpha, 7^\alpha \times 36)$ i.e. choice (vote cast) is "Red"
4. $(X, Y)=(2^\alpha, 7^\alpha \times 17)$ i.e. choice (vote cast) is "I abstain"

for some unspecified value of $\alpha$ without revealing which of them actually does hold.

There are a variety of standard methods that can be used to accomplish this. See, for example, R. Cramer, I. Damgård, B. Schoenmakers, *Proofs of partial knowledge and simplified design of witness hiding protocols,* Advances in Cryptology—CRYPTO '94, Lecture Notes in Computer Science, pp. 174–187, Springer-Verlag, Berlin, 1994. The Secret Value Confirmation technique used by the facility works equally well with any method that satisfies the abstract criteria of the previous paragraph. While details of one such validity proof method are provided below, embodiments of the facility may use validity proofs of types other than this one.

Validity Proof Construction:
(In what follows, each action or computation which V is required to perform is actually carried out by V's computer.)
1. V sets $\alpha_2 = \alpha = 5$.
2. V generates $\omega_2 \in_R Z_{23}$, $r_1, r_3, r_4 \in_R Z_{23}$, $s_1, s_3, s_4 \in_R Z_{23}$ all randomly and independently. For this example we take $\omega_2 = 4$ $r_1 = 16,\ r_3 = 17,\ r_4 = 21$ $s_1 = 12,\ s_3 = 4,\ s_4 = 15 \qquad (4)$ 3. V computes corresponding values $$a_1 = g^{r_1} X^{-s_1} = 2^{16} \times 32^{11} = 4$$

$$a_2 = g^{\omega_2} = 2^4 = 16$$

$$a_3 = g^{r_3} X^{-s_3} = 2^{17} \times 32^{19} = 6$$

$$a_4 = g^{r_4} X^{-s_4} = 2^{21} \times 32^8 = 9 \tag{5}$$

$$b_1 = h^{r_1}(Y/9)^{-s_1} = 7^{16} \times (24/9)^{11} = 18$$

$$b_2 = h^{\omega_2} = 7^4 = 4$$

$$b_3 = h^{r_3}(Y/36)^{-s_3} = 7^{17} \times (24/36)^{19} = 1$$

$$b_4 = h^{r_4}(Y/17)^{-s_5} = 7^{21} \times (24/17)^8 = 7 \tag{6}$$

4. V uses a publicly specified hash function H to compute $c \in Z_{23}$ as $$c = H(\{X, Y, a_i, b_i\}) 1 \leq i \leq 4 \tag{7}$$

Since many choices of the hash function are possible, for this example we can just pick a random value, say $$c = 19. \tag{8}$$

(In practice, SHA1, or MD5, or other such standard secure hash function may be used to compute H.)

5. V computes the interpolating polynomial P(x) of degree 4−1=3. The defining properties of P are $$P(0) = c = 19$$

$$P(1) = s_1 = 12$$

$$P(3) = s_3 = 4$$

$$P(4) = s_4 = 15 \tag{9}$$

$P(x) = \Sigma_{j=0}^{3} z_j x^j$ is computed using standard polynomial interpolation theory, to yield:

$$P(x) = x^3 + 20x^2 + 18x + 19 \tag{10}$$

or $$z_0 = 19 \; z_1 = 18$$

$$z_2 = 20 \; z_3 = 1 \tag{11}$$

6. V computes the values $$s_2 = P(2) = 5$$

$$r_2 = \omega_2 + \alpha_2 s_2 = 4 + 5 \times 5 = 6 \tag{12}$$

7. V's validity proof consists of the 12 numbers $$\{a_k, b_k, r_k\}_{k=1}^{6} \tag{13}$$

and the three numbers $$\{z_k\}_{k=1}^{3} \tag{14}$$

in precise sequence. ($z_0$ need not be submitted since it is computable from the other data elements submitted using the public hash function H.)

Having computed the required choice encryption, (X, Y), and the corresponding proof of validity, V encodes these elements, in sequence, as defined by the standard encoding format. The resulting sequences form V's voted ballot. (In order to make the ballot unalterable, and indisputable, V may also digitally sign this voted ballot with his private signing key. The resulting combination of V's voted ballot, and his digital signature (more precisely, the standard encoding of these two elements) forms his signed voted ballot.)

Finally, each voter transmits his (optionally signed) voted ballot back to the data center collecting the votes.

As described above, the voter specific random parameters for V ($\beta$ and K) are available at the vote collection center. In this example, these are $$\beta = 18 \; K = 37 \tag{15}$$

When the voter's (optionally signed) voted ballot is received at the vote collection center, the following steps are executed 1. The digital signature is checked to determine the authenticity of the ballot, as well as the eligibility of the voter.
2. If the signature in step 1 verifies correctly, the vote collection center then verifies the proof of validity. For the particular type of validity proof we have chosen to use in this example, this consists of
   (a) The public hash function H is used to compute the value of $P(0) = z_0$ $$z_0 = P(0) = H(\{X, Y, a_i, b_i\}_{i=1}^{4}) = 19 \tag{16}$$

(Recall that the remaining coefficients of P, $z_1, z_2, z_3$, are part of V's (optionally signed) voted ballot submission.)
   (b) For each $1 \leq j \leq 4$ both sides of the equations $$a_j = g^{r_1} x_j^{-P(j)}$$

$$b_j = h^{r_1}(y_j/\mu_j)^{-P(j)} \tag{17}$$

are evaluated. (Here, as described above, the $\mu_j$ are taken from the Decision Encoding Scheme.) If equality fails in any of these, verification fails. This ballot is not accepted, and some arbitrary rejection string (indication) is sent back to V.
3. Assuming that the previous steps have passed successfully, the reply string (W, U) is computed as $$W = KY^\beta = 37 \times 24^{18} = 9$$

$$U = h^\beta = 7^{18} = 42 \tag{18}$$

This sequenced pair is encoded as specified by the public encoding format, and returned to V.

4. V's computer calculates $$C = W/U^\alpha = 9/(42)^5 = 18 \tag{19}$$

and displays this string to V. (Alternatively, the protocol may specify that a public hash function is computed on C and the resulting hash value displayed. In this example, C, itself is displayed.) If V's computer attempted to submit a choice other than "Green", the value of C computed above would be different. Moreover, the correct value of C can not be computed from an incorrect one without solving the Diffie-Hellman problem. (For the small values of p and q we have used here, this is possible, however, for "real" cryptographic parameters, V's computer would unable to do this.) Thus, if V's computer has submitted an encrypted ballot which does not correspond to V's choice, there are only two things it can do at the point it is expected to display a confirmation. It can display something, or it can display nothing. In the case that nothing is displayed, V may take this as indication that the ballot was corrupted. In the case that something is displayed, what is displayed will almost certainly be wrong, and again, V may take this as indication that the ballot was corrupted.

5. V now compares the value of C displayed to the value found in V's confirmation dictionary corresponding to the choice, "Green" (V's intended choice). At this point, V may have already received his confirmation dictionary in advance, or may obtain a copy through any independent channel. An example of such a channel would be to use a fax machine. If the displayed value does not match the corresponding confirmation string in the confirmation dictionary, corruption is detected, and the ballot can be "recast" in accordance with election specific policy.

Each voter confirmation dictionary is computed by the vote collection center, since, as described above, it is the entity which has knowledge of the voter specific values of $\alpha$ and K. For the case of the voter, V, we have been considering, the dictionary is computed as

| Choice | Confirmation String |
|---|---|
| "Blue" | $C_1 = K\mu^\beta_1 = 37 \times 9^{18} = 16$ |
| "Green" | $C_2 = K\mu^\beta_2 = 37 \times 21^{18} = 18$ |
| "Red" | $C_3 = K\mu^\beta_3 = 37 \times 36^{18} = 36$ |
| "I abstain" | $C_4 = K\mu^\beta_4 = 37 \times 17^{18} = 8$ |

Figure 2:
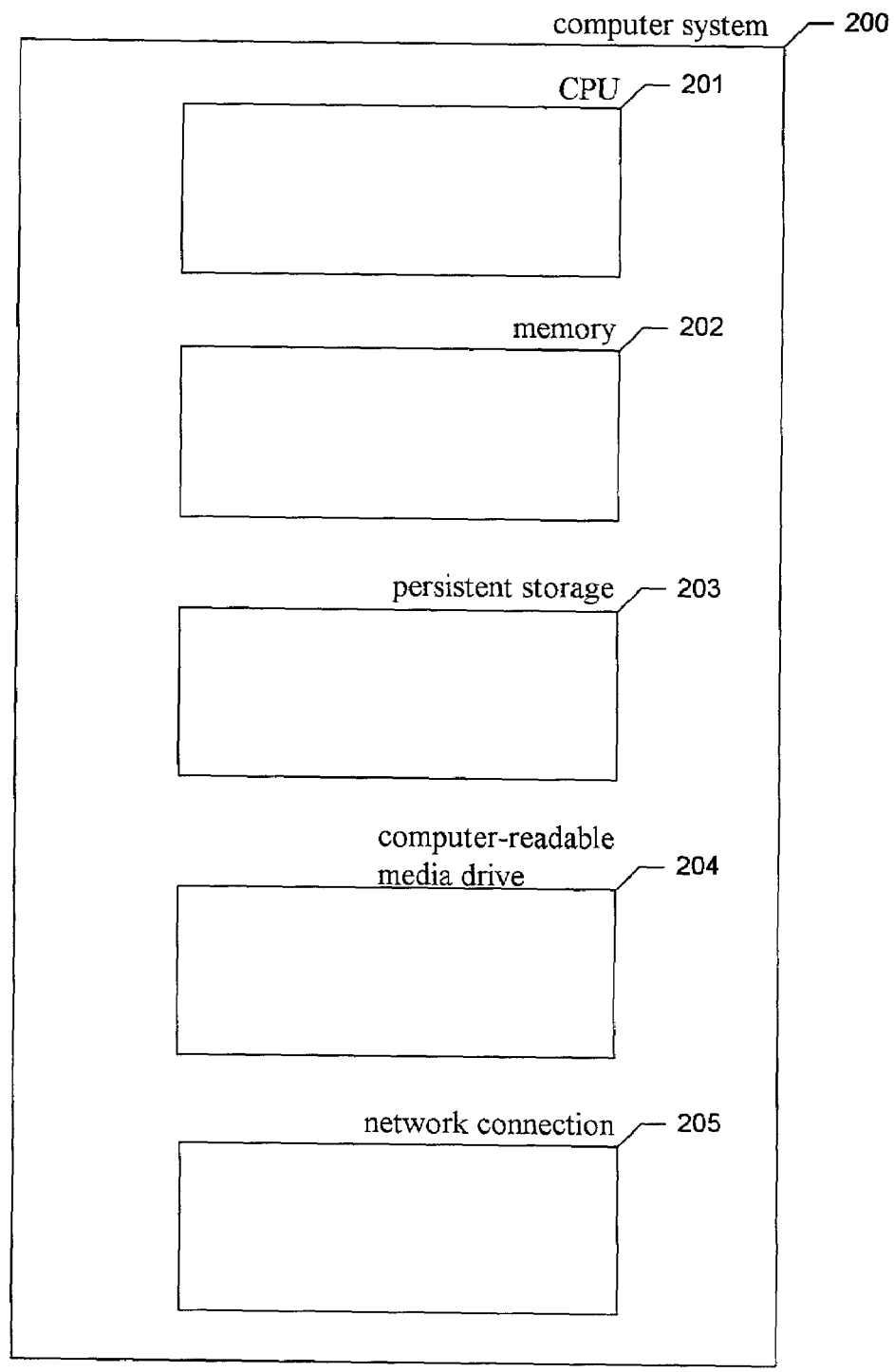
FIG. 2 is a block diagram showing some of the components typically incorporated in at least some of the computer systems and other devices on which the facility executes.
Figure 3:
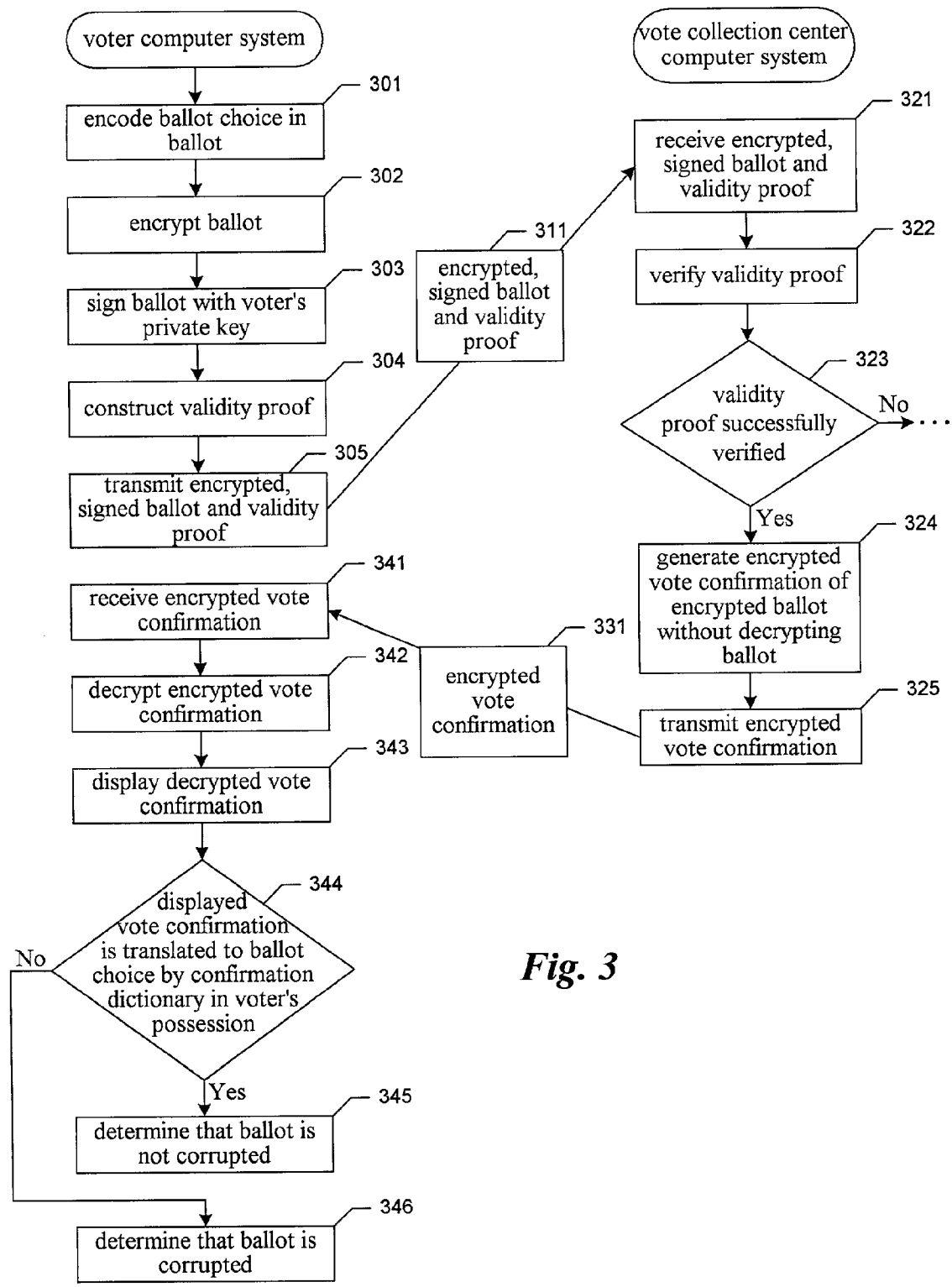
FIG. 3 is a flow diagram showing steps typically performed by the facility in order to detect a compromised ballot.

FIGS. 1–3 illustrate certain aspects of the facility. FIG. 1 is a high-level block diagram showing a typical environment in which the facility operates. The block diagram shows several voter computer systems 110, each of which may be used by a voter to submit a ballot and verify its uncorrupted receipt. Each of the voter computer systems are connected via the Internet 120 to a vote collection center computer system 130. Those skilled in the art will recognize that voter computer systems could be connected to the vote collection center computer system by networks other than the Internet, however. The facility transmits ballots from the voter computer systems to the vote collection center computer system, which returns an encrypted vote confirmation. In each voter computer system, the facility uses this encrypted vote confirmation to determine whether the submitted ballot has been corrupted. While preferred embodiments are described in terms in the environment described above, those skilled in the art will appreciate that the facility may be implemented in a variety of other environments including a single, monolithic computer system, as well as various other combinations of computer systems or similar devices connected in various ways.

FIG. 2 is a block diagram showing some of the components typically incorporated in at least some of the computer systems and other devices on which the facility executes, such as computer systems 110 and 130. These computer systems and devices 200 may include one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet. While computer systems configured as described above are preferably used to support the operation of the facility, those skilled in the art will appreciate that the facility may be implemented using devices of various types and configurations, and having various components.

FIG. 3 is a flow diagram showing steps typically performed by the facility in order to detect a compromised ballot. Those skilled in the art will appreciate that the facility may perform a set of steps that diverges from those shown, including proper supersets and subsets of these steps, reorderings of these steps, and steps of sets in which performance of certain steps by other computing devices.

In step 301, on the voter computer system, the facility encodes a ballot choice selected by the voter in order to form a ballot. In step 302, the facility encrypts this ballot. In some embodiments, the encrypted ballot is an ElGamal pair, generated using an election public key and a secret maintained on the voter computer system. In step 303, the facility optionally signs the ballot with a private key belonging to the voter. In step 304, the facility constructs a validity proof that demonstrates that the encrypted ballot is the encryption of a ballot in which a valid ballot choice is selected. In step 305, the facility transmits the encrypted, signed ballot and the validity proof 311 to a vote collection center computer system.

In step 321, the facility receives this transmission in the vote collection center computer system. In step 322, the facility verifies the received validity proof. In step 323, if the validity proof is successfully verified, then the facility continues with 324, else the facility does not continue in step 324. In step 324, the facility generates an encrypted confirmation of the encrypted ballot. The facility does so without decrypting the ballot, which is typically not possible in the vote collection center computer system, where the secret used to encrypt the ballot is not available. In step 325, the facility transmits the encrypted confirmation 331 to the voter computer system.

In step 341, the facility receives the encrypted vote confirmation in the voter computer system. In step 342, the facility uses the secret maintained on the voter computer system to decrypt the encrypted vote confirmation. In step 343, the facility displays the decrypted vote confirmation for viewing by the user. In step 344, if the displayed vote confirmation is translated to the ballot choice selected by the voter by a confirmation dictionary in the voter's possession, then the facility continues in step 345, else the facility continues in step 346. In step 345, the facility determines that the voter's ballot is not corrupted, whereas, in step 346, the facility determines that the voter's ballot is corrupted. In this event, embodiments of the facility assist the user in revoking and resubmitting the voter's ballot.

It will be appreciated by those skilled in the art that the above-described facility may be straightforwardly adapted or extended in various ways. While the foregoing description makes reference to preferred embodiments, the scope of the invention is defined solely by the claims that follow and the elements recited therein.

I claim:

1. A method in a data processing system for discerning corruption of an electronic ballot, comprising:

in a voter computer system:
 receiving a ballot choice selected by a voter from among a set of valid ballot choices;
 encoding the received ballot choice in a ballot;
 encrypting the ballot;
 constructing a validity proof proving that the encrypted ballot corresponds to a valid ballot choice;
 sending the encrypted ballot and the validity proof to a vote collection center computer system;

in the vote collection center computer system:
 receiving the encrypted ballot and validity proof;
 verifying the validity proof;
 only if the validity proof is successfully verified:

without decrypting the encrypted ballot, generating an encrypted vote confirmation of the encrypted ballot;
sending the encrypted vote confirmation to the voter computer system;
in the voter computer system:
receiving the encrypted vote confirmation;
decrypting the encrypted vote confirmation to obtain a vote confirmation;
displaying the obtained vote confirmation; and
if a confirmation dictionary in the user's possession does not translate the displayed vote confirmation to the ballot choice selected by the voter, determining that the ballot has been corrupted.

2. The method of claim 1 wherein the encoding comprises selecting a value having a predetermined correspondence to the selected ballot choice.

3. The method of claim 1 wherein the encrypting is performed using an election public key.

4. The method of claim 1 wherein encrypting the ballot comprises generating an ElGamal pair representing the ballot.

5. The method of claim 1, further comprising signing the encrypted ballot with a private key of the voter before sending the encrypted ballot to the vote collection center computer system.

6. The method of claim 1 wherein the vote collection center computer system sends the encrypted vote confirmation to the voter computer system via a first communication channel, further comprising, in the vote collection center computer system, sending the confirmation dictionary to the voter via a second communications channel distinct from the first communications channel.

7. The method of claim 6 wherein the confirmation dictionary is sent in response to a request from the voter.

8. The method of claim 7 wherein the request includes one or more identifiers associated with the voter.

9. The method of claim 6 wherein the confirmation dictionary is sent without being requested by the voter.

10. The method of claim 6 wherein individual confirmation dictionaries are sent to each of a plurality of voters including the voter.

11. The method of claim 1, further comprising applying a hash function to the decrypted vote confirmation before it is displayed, and wherein it is determined that the ballot has been corrupted if the confirmation dictionary in the user's possession does not translate the displayed hashed decrypted vote confirmation to the ballot choice selected by the voter.

12. A computer-readable medium whose content cause a data processing system to discern corruption of an electronic ballot by:
in a voter computer system:
receiving a ballot choice selected by a voter from among a set of valid ballot choices;
encoding the received ballot choice in a ballot;
encrypting the ballot;
constructing a validity proof proving that the encrypted ballot corresponds to a valid ballot choice;
sending the encrypted ballot and the validity proof to a vote collection center computer system;
in the vote collection center computer system:
receiving the encrypted ballot and validity proof;
verifying the validity proof;
only if the validity proof is successfully verified:
without decrypting the encrypted ballot, generating an encrypted vote confirmation of the encrypted ballot;
sending the encrypted vote confirmation to the voter computer system;
in the voter computer system:
receiving the encrypted vote confirmation;
decrypting the encrypted vote confirmation;
displaying the decrypted vote confirmation; and
if a confirmation dictionary in the user's possession does not translate the displayed decrypted vote confirmation to the ballot choice selected by the voter, determining that the ballot has been corrupted.

13. A method in a data processing system for discerning corruption of an electronic ballot, comprising, in a ballot receiving node:
receiving an encrypted ballot value from a ballot sending node, the encrypted ballot value being encrypted from a ballot value based on a voter selection using a secret not available in the ballot receiving node;
generating from the encrypted ballot value an encrypted secret value confirmation that indicates to those in possession of the secret used to encrypt the encrypted ballot value the ballot value to which the received encrypted ballot value corresponds; and
sending the encrypted secret value confirmation to the ballot sending node,
such that the encrypted secret value confirmation may be used in the ballot sending node to determine if the encrypted ballot value received at the ballot receiving node corresponds to the ballot selection made by the voter,
wherein the secret value confirmation is sent to the ballot sending node via a first communication channel, further comprising sending to the ballot sending node a confirmation dictionary via a second communication channel distinct from the first communication channel, the confirmation dictionary translating from various possible secret value confirmations to the ballot values to which they correspond.

14. The method of claim 13 wherein the secret value confirmation is generated without decrypting the encrypted ballot value.

15. The method of claim 13 wherein the encrypted secret value confirmation is encrypted in such a manner that, in the ballot sending node, given the encrypted secret value confirmation corresponding to a selection other than the voter selection, it is intractable to generate a decrypted secret value confirmation corresponding to the voter selection.

* * * * *